Dec. 17, 1968            J. PICKLES            3,416,386
THREADED DRIVE GEAR WITH ABUTMENT FOR SCREW SHAFT
Filed April 7, 1967
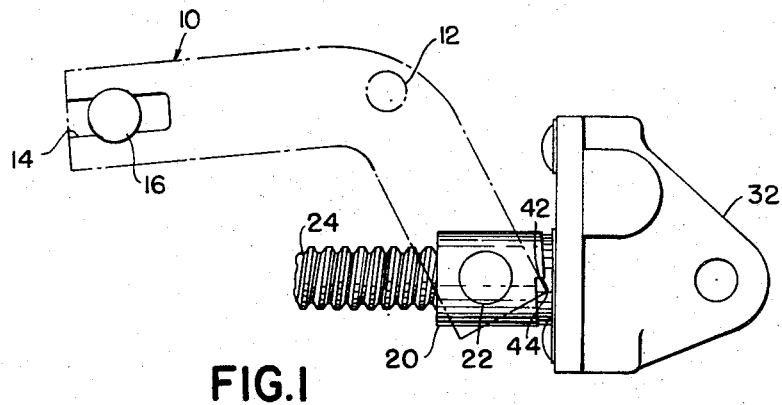
FIG.1
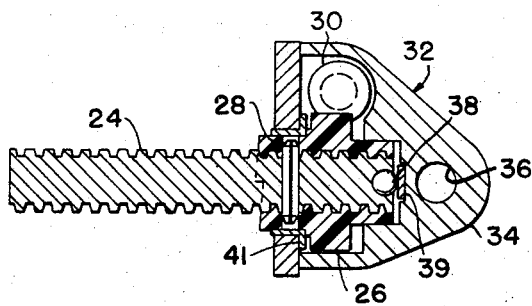
FIG.2
FIG.4
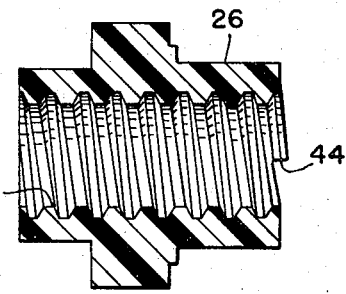
FIG.3
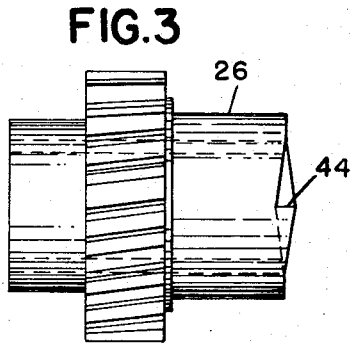
INVENTOR
JOSEPH PICKLES
BY *Whittemore, Hulbert & Belknap*
ATTORNEYS

United States Patent Office

3,416,386
Patented Dec. 17, 1968

3,416,386
THREADED DRIVE GEAR WITH ABUTMENT
FOR SCREW SHAFT
Joseph Pickles, Bloomfield Hills, Mich., assignor to Ferro
Manufacturing Corporation, Detroit, Mich., a corporation of Michigan
Continuation-in-part of application Ser. No. 539,037,
Mar. 31, 1966. This application Apr. 7, 1967, Ser.
No. 629,142
12 Claims. (Cl. 74—424.8)

ABSTRACT OF THE DISCLOSURE

A drive gear for a screw shaft, the gear being provided with internal threads for engagement with threads on the shaft to take axial loading, the gear having a generally radially facing shoulder for engagement with a similarly shaped but oppositely facing shoulder on a nut, and the combination of the screw shaft, threaded drive gear, and nut.

Cross-reference to related application

This is a continuation-in-part of application Ser. No. 539,037, filed Mar. 31, 1966, now Patent No. 3,365,163.

Background of the invention

In the development of transmissions for accessories or components such for example as seat adjusters for vehicle seats, it has been common practice to provide a threaded drive shaft or screw shaft associated with a nut held against rotation and movable longitudinally of the screw shaft. When the vehicle component, such for example as the adjustable seat, reached its limit of movement so that an electric motor connected to the drive shaft was stalled, the forces developed tended to produce a frictional interlock between the threads of the screw shaft and nut. In order to overcome this difficulty, as disclosed in his prior Patent No. 2,944,436, applicant provided generally radially facing abutment means to limit rotation of the screw shaft without setting up any frictional loading between the threads. Inasmuch as the mechanical advantage of a screw and nut combination is very large, it was possible to transmit relatively great forces on a driven component, such for example as a lever connected to a vehicle seat. These forces require a strong load-resisting construction connecting the drive gear to the screw shaft and also an arrangement which positively insures proper location of the drive gear so that the stop abutment thereon will coact properly with a similar stop abutment on the traveling nut.

Summary of the invention

The present invention involves the use of a drive gear having internally formed threads permitting the drive gear to be threaded onto the screw shaft and pinned thereon to transmit torque thereto, the internal threads of the drive gear having a definite relationship to a radially extending abutment surface so as to insure proper coaction between the abutment surface on the drive gear and a similar abutment surface on a traveling nut.

It is an object of the present invention to provide a drive gear of the character described, preferably formed of as uitable resin such for example as nylon, the gear being provided at one end with an abutment surface engageable with an oppositely facing abutment surface on a traveling nut to serve as stop means for rotation of the screw shaft without frictional jamming.

It is a further object of the present invention to provide, in combination with a screw shaft, a traveling nut having at one end an abutment surface preferably generally radial but in any event extending at a relatively large non-jamming angle with respect to a plane perpendicular to the axis of the nut, and a drive gear having internal threads threaded on the screw shaft, the drive gear having a similar but oppositely facing abutment engageable with the abutment on the nut to limit relative rotation between the screw shaft and nut without jamming.

Other objects and features of the invention will become apparent as the description proceeds, especially when taken in conjunction with the accompanying drawing, illustrating a preferred embodiment of the invention.

Brief description of the drawing

FIGURE 1 is an elevational view showing the relationship between a screw shaft, a traveling nut, and a drive gear threaded and pinned to the shaft.

FIGURE 2 is a sectional view through the housing for the worm-worm gear transmission.

FIGURE 3 is an elevational view of the drive gear.

FIGURE 4 is a longitudinal sectional view of the drive gear.

Description of the preferred embodiment

In power equipment for motor vehicles it has become common practice to use the combination of a screw shaft and traveling nut for effecting movement of accessories and components. A good example of the application of this equipment in a motor vehicle is in seat adjustment in which the actual lifting movement may be applied to the seat through lever construction such as the bell crank lever 10 shown in FIGURE 1. In this figure the bell cranks are normally provided in pairs adjacent the front edge of the seat and adjacent the rear edge of the seat. Accordingly, actuation of the pair of levers at either the front or the rear of the seat results in tilting the seat, whereas simultaneous rotation of the levers in the same direction results essentially in raising and lowering the seat. For purposes of illustration the lever 10 is indicated as provided with an intermediate pivot 12 and is provided with a slot 14 at one end adapted to receive a pin or the like 16 for sliding movement, the arrangement providing for substantially vertical movement of the pin 16 without binding.

The movement of the bell crank lever 10 is provided by a traveling nut 20 which has pins or ears 22 extending through openings in the other arm of the bell crank lever 10. The nut 20 is adapted to travel longitudinally on the screw shaft 24 and the pins 22 not only provide for relative pivotal movement between the nut 20 and the bell crank lever 10, but also serve as means for preventing rotation of the nut.

The screw shaft 24 has associated therewith suitable driving means which in the present instance comprises a gear 26 pinned in required position adjacent one end of the shaft by a pin indicated at 28.

Rotation is imparted to the gear 26 by suitable means such for example as a worm indicated at 30, and the worm 30 and worm gear 26 are included in a suitable housing 32 as seen in FIGURE 2, the housing being provided with an extension 34 by means of which it is supported for pivotal movement by a pivot mounting including means extending through the opening 36. It will be appreciated that in use the housing 32, the worm 30 and worm gear 26, the screw shaft 24, and the nut 20 all swing about the axis of opening 36, the opposite end of the screw shaft 22 being freely movable to accommodate the motion resulting from movement of the nut 20 about the pivot mounting 12 of the bell crank lever 10.

Referring to FIGURE 2 it will be observed that the screw shaft 24 has at one end a recess 38 the inner portion of which is spherical and which is dimensioned to receive a thrust ball so that a side of the ball extends slightly beyond the end of the recess 38. The ball is of course engageable with a thrust bearing 39 received in the housing 32 and is effective to take loading of the shaft to the right as seen in FIGURES 1 and 2. However, in vehicle seats, while loading may normally be in one direction as applied by the weights of the passengers on the seats, this loading may be reversed under certain conditions such for example as collisions and accordingly, it is essential to provide adequate support resisting movement of the screw shaft 24 to the left as seen in these figures.

This is accomplished in the present instance by providing the drive gear 26 as illustrated in detail in FIGURES 3 and 4. Essentially, the structure which provides adequate support for the screw shaft under impact or collision conditions is the internal threads indicated at 40 which threads are shaped to engage the threads of the screw shaft 24 and which accordingly provide very substantial strength opposing separation between the gear 26 and the screw shaft 24 in a direction axially of the screw shaft. It will be observed in FIGURE 4 that the threaded portion of the gear 26 is elongated, in the illustrated embodiment having eight convolutions of thread. This is particularly desirable because the internally threaded gear 26 is preferably formed of a plastic material or resin such for example as nylon.

The gear 26 is mounted in the housing 32 with suitable thrust bearings 41 retaining the gear solidly in the housing against axial displacement. Furthermore, the mounting of the housing 32 by means of the pivot support including the opening 36, may have the required strength to resist any anticipated load.

Inasmuch as the gear 26 is threaded onto the end of the shaft 24 and is locked in position by the provision of the pin 28, it will be appreciated that due to the relatively great mechanical advantage inherent in screw and nut combinations, the torque required to rotate the screw shaft is relatively small even under heavy applied loading to the vehicle seat and accordingly, the relatively small drive pin 28 coupling the gear to the screw shaft is adequate to provide the required torque.

Means are provided to prevent jamming when the vehicle seat reaches a limiting position. Means of this type are generally illustrated in my prior Patent 2,944,436 and constitute generally radially extending circumferentially facing surfaces between the traveling nut and a stop element which are engageable to limit or determine movement of the traveling nut. In the absence of such stop means the forces developed result in frictional jamming between the threads of the nut and screw shaft. With the present construction there is no frictional jamming whatever. Rotation of the screw shaft is determined by engagement between the abutment surfaces.

Specifically, the nut 20 is provided with one or more abutment surfaces 42 coacting with one or more corresponding abutment surfaces 44 formed on the gear 26. By initially forming the abutments or shoulders 42 and 44 in properly oriented relationship with respect to the location of the threads of the nut 20 and gear 26, it follows that when the gear and nut are threaded onto the same screw shaft, the abutment shoulders are in exactly proper relationship so that the shoulder 44 on the gear will just clear a shoulder 42 on the nut and will solidly engage the next succeeding shoulder on a further half-turn. These surfaces as seen in FIGURE 1, may be described as generally circumferentially facing, and extend at substantial angles to planes perpendicular to the axis of the shaft.

Accordingly, the invention resides in the combination of the screw shaft 24, the nut 20 adapted to travel thereon upon rotation of the screw shaft, in combination with the particular internally threaded drive gear having abutment means at one end in properly determined location to coact with abutment means on the traveling nut simply by the threading of the drive gear and the nut to the same screw shaft. In addition, the drive gear is further characterized in the provision of the internal threads thereon which provides adequate strength to support the screw shaft 24 against being separated from the drive gear by axial loading.

The drawings and the foregoing specification constitute a description of the improved threaded drive gear with abutment for screw shaft in such full, clear, concise and exact terms as to enable any person skilled in the art to practice the invention, the scope of which is indicated by the appended claims.

What I claim as my invention is:

1. A drive gear for a screw shaft subject to reverse axial loadings, said drive gear having an internally threaded opening to provide for screwing the gear onto the screw shaft, said gear having at one end an abutment surface extending at a substantial angle to a plane perpendicular to the axis of the gear engageable with a similar oppositely facing abutment surface on a traveling nut threaded to said shaft.

2. A gear as defined in claim 1, said abutment surface having a predetermined location with reference to the thread so as to insure proper coaction between its abutment and an abutment similarly located on a traveling nut threaded to a shaft to which said nut is threaded.

3. In combination, actuating means comprising a rotatable screw shaft, a traveling nut threaded to said shaft, means preventing rotation of said nut, a drive gear threaded to said shaft, and abutment surfaces at confronting sides of said nut and gear extending at substantial angles to planes perpendicular to the axis of said shaft.

4. The combination defined in claim 3 in which said gear is formed of a plastic material such as nylon.

5. The combination defined in claim 4 in which said abutment surfaces are generally radially extending circumferentially facing surfaces.

6. The combination defined in claim 4 in which said gear is pinned to said shaft.

7. The combination defined in claim 6, said gear having an axially elongated internally threaded sleeve to provide a plurality of thread convolutions.

8. The combination defined in claim 3 in which said abutment surfaces are generally radially extending circumferentially facing surfaces.

9. The combination defined in claim 3 in which the abutment surfaces on said nut and said gear are positioned relative to the threads thereon such that when threaded onto the same screw shaft, the abutment surfaces are positioned relative to each other for proper coaction.

10. In combination, a rotatable screw shaft, a traveling nut on said shaft, a support for said shaft providing for rotation of said shaft but preventing axial movement thereof relative to said support, said support comprising a housing surrounding one end of said shaft, bearing means interposed between said housing and the end of said shaft within said housing to prevent axial movement of said shaft relative to said housing in one direction, a drive gear within said housing threaded to the end portion of said shaft within said housing, means interconnecting said drive gear and shaft to prevent relative rotation therebetween, and thrust bearing means interposed between said drive gear and housing to prevent axial movement of said drive gear and said threaded shaft relative to said housing in the other direction.

11. The combination defined in claim 10 in which said gear is formed of a plastic material such as nylon.

12. The combination defined in claim 11 in which the gear has an axially elongated tubular extension provided throughout with internal threades engaging the threads on said shaft, said extension extending to the exterior of said housing, said nut and the outer end of said extension having generally circumferentially facing abutment surfaces.

References Cited

UNITED STATES PATENTS

| | | | |
|---|---|---|---|
| 3,178,958 | 4/1965 | Beck | 74—424.8 |
| 3,199,364 | 8/1965 | Dew | 74—460 |
| 3,212,747 | 10/1965 | Hansen et al. | 74—424.8 X |
| 3,316,034 | 4/1967 | Wanlass | 74—424.8 X |
| 3,339,892 | 9/1967 | Dixon | 74—424.8 X |

FRED C. MATTERN, Jr., *Primary Examiner.*

LEONARD H. GREEN, *Assistant Examiner.*